United States Patent
Ohno et al.

(10) Patent No.: US 8,631,402 B2
(45) Date of Patent: Jan. 14, 2014

(54) CENTER MANAGEMENT APPARATUS, METHOD, AND COMPUTER READABLE STORAGE MEDIUM STORING PROGRAM THEREOF

(75) Inventors: Takashi Ohno, Kawasaki (JP); Kenichi Horio, Kawasaki (JP); Satoshi Okuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1034 days.

(21) Appl. No.: 12/289,906

(22) Filed: Nov. 6, 2008

(65) Prior Publication Data
US 2009/0125903 A1 May 14, 2009

(30) Foreign Application Priority Data
Nov. 13, 2007 (JP) ................................. 2007-294058

(51) Int. Cl.
*G06F 9/455* (2006.01)
(52) U.S. Cl.
USPC ................................. 718/1; 718/100; 718/102
(58) Field of Classification Search
None
See application file for complete search history.

(56) References Cited

U.S. PATENT DOCUMENTS

| 5,960,205 | A | 9/1999 | Mao et al. |
|---|---|---|---|
| 6,055,503 | A | 4/2000 | Horstmann |
| 7,010,584 | B1 | 3/2006 | Craft |
| 2002/0162049 | A1 | 10/2002 | Takamoto et al. |
| 2005/0091354 | A1 | 4/2005 | Lowell et al. |
| 2006/0101400 | A1* | 5/2006 | Capek et al. ................ 717/120 |
| 2006/0155735 | A1* | 7/2006 | Traut et al. .................. 707/101 |
| 2006/0184937 | A1* | 8/2006 | Abels et al. ...................... 718/1 |
| 2008/0104588 | A1 | 5/2008 | Barber et al. |
| 2008/0134178 | A1* | 6/2008 | Fitzgerald et al. ............... 718/1 |
| 2009/0119664 | A1* | 5/2009 | Pike et al. ....................... 718/1 |
| 2010/0088699 | A1* | 4/2010 | Sasaki ............................. 718/1 |

FOREIGN PATENT DOCUMENTS

| JP | 04-213152 | 8/1992 |
|---|---|---|
| JP | 6-243011 | 9/1994 |
| JP | 10-171663 | 6/1998 |
| JP | 2003-158534 | 5/2003 |
| JP | 2005-115717 | 4/2005 |
| JP | 2006-285620 | 10/2006 |

OTHER PUBLICATIONS

United Kingdom Search Report dated Jan. 20, 2009 and issued in corresponding United Kingdom Patent Application GB0819329.4.
UK Office Action dated Nov. 30, 2011 issued in corresponding UK Patent Application No. GB0819329.4.
Japanese Office Action issued Aug. 14, 2012 in corresponding Japanese Patent Application No. 2007-294058.
Kiyohiro Noguchi et al., "Technologies of the Storage Centric Network System", IEICE, vol. 89, No. 11, Nov. 2006, pp. 954-961.

* cited by examiner

*Primary Examiner* — Emerson Puente
*Assistant Examiner* — Dong Kim
(74) *Attorney, Agent, or Firm* — Staas & Halsey LLP

(57) ABSTRACT

A duplicator duplicates a specified guest program to create a guest copy. A virtual machine activation requester selects a center apparatus for maintenance and requests the selected center apparatus for maintenance to activate a virtual machine based on the guest copy. A maintenance requester requests the activated virtual machine to perform a maintenance process. After the maintenance process, when the guest copy has been changed, a maintenance reflector replaces with the guest copy the guest program, among data stored in a guest program storage, associated with a specified program ID.

16 Claims, 9 Drawing Sheets

CENTER MANAGEMENT APPARATUS, METHOD, AND COMPUTER READABLE STORAGE MEDIUM STORING PROGRAM THEREOF

BACKGROUND

1. Field

The present invention relates to a center management apparatus that manages a center apparatus that performs a process described in a guest program in a virtual machine environment, and in particular, relates to a center management method for facilitating maintenance of the guest program.

2. Description of the Related Art

As personal computers (PCs) have become widely available, protection of important data stored in PCs used by individual employees and maintenance costs of many PCs have caused problems in enterprises. A thin client system attracts attention as a solution to these problems (for example, see Japanese Laid-open Patent Publication No. 2003-158534). A thin client system is a computer system in which, instead of performing an application using a PC, the application is performed by accessing, from a remote terminal via a communication network, a server or a PC that is managed in a center (hereinafter generically referred to as a center apparatus). A thin client system may be implemented in a virtual machine. Specifically, an environment for a user's usage is virtually created in a center apparatus so that it seems to the user who operates a terminal that a real machine provided the environment for the usage is operating. In this case, actually, data for implementing the environment of the user's usage (referred to as a guest program) is managed in a center, and a virtual machine based on the guest program is activated in an appropriate center apparatus in response to a request for usage from the user. In other words, the guest program is loaded, and a process described in the guest program is performed, so that it seems to the user who operates the terminal that a real machine is operating. A plurality of virtual machines may be constructed in a single center apparatus.

Moreover, when a maintenance process such as virus check and update of an operating system (OS) is performed on a guest program, a virtual machine based on the guest program is activated in an appropriate center apparatus, and the virtual machine performs a process described in a maintenance program. If a maintenance process that changes the guest program is performed during user's usage, the change made by the maintenance process and user's usage conflict with each other. Thus, the maintenance process cannot be performed during user's usage. Even in a case where the maintenance process for the guest program is started when it is not used by the user, the user may start usage in the middle of the maintenance process. Thus, it is necessary to refuse user's usage until the maintenance process has been completed.

As a technique for handling a conflict between user's usage and a maintenance process, for example, an automatic maintenance method for a database is provided (see Japanese Laid-open Patent Publication No. H06-243011). The method is provided to automatically determine, on the basis of data indicative of the operation of a database, a time period during which a maintenance process can be performed.

Even when the technique discussed in Japanese Laid-open Patent Publication No. H06-243011 is used, user's usage needs to be refused during the maintenance process.

SUMMARY

Accordingly, it is an object of the present invention to provide a center management method that allows performing a maintenance process for a guest program so that user's usage is not disturbed so much.

According to an aspect of the present invention, provided is a center management apparatus for managing a center apparatus for performing, in a virtual machine environment, a process described in a guest program. The center management apparatus includes a guest program storage, a maintenance instruction input unit, a duplicator, a virtual machine activation requester, a maintenance requester, a maintenance reflector. The guest program storage stores guest programs in association with data capable of identifying each of the guest programs. The maintenance instruction input unit accepts designation of first data and second data. The first data is capable of identifying a maintenance program describing a maintenance process. The second data is capable of identifying a guest program to receive maintenance. The duplicator performs a duplication process of duplicating a guest program to generate a guest copy. The guest program is identified with the second data. The virtual machine activation requester requests the center apparatus to activate a virtual machine by transmitting a first control signal indicating an instruction for performing a process described in the guest copy. The maintenance requester requests the center apparatus to perform a maintenance process by transmitting a second control signal indicating an instruction for performing the maintenance process. The center apparatus performs the process described in the guest copy. The maintenance process is described in a maintenance program identified with the first data. The maintenance reflector performs a replacement process of replacing the guest program with the guest copy if the guest copy has been changed as a result of the maintenance process. The guest program is identified with the second data.

The center management apparatus may further include a usage monitor for determining whether the guest program is active. In such a configuration, the duplicator may stop the duplication process if the usage monitor determines that the guest program is active, and the maintenance reflector may stop the replacement process if the usage monitor determines that the guest program is active.

The guest program storage of the center management apparatus may store an execution flag in association with the guest program. The execution flag is capable of indicating whether the process described in the guest program is active. The duplicator may stop the duplication process if the execution flag indicates that the process described in the guest program is active. The maintenance requester may stop the transmission of the second control signal if the execution flag indicates that the process is active. The maintenance reflector may stop the replacement process if the execution flag indicates that the process described in the guest program is active before starting the replacement process. If the execution flag indicates that the process described in the guest program is inactive before starting the replacement process, the maintenance reflector may set the execution flag to indicate that the process described in the guest program is active, perform the replacement process, and set the execution flag to indicate that the process described in the guest program is inactive upon completion of the replacement process.

The maintenance reflector of the center management apparatus may perform the replacement process only when the guest program has not been changed from the guest program of a time when the duplication process was performed.

The center management apparatus may further include an update data acquirer and an update data storage. The update data acquirer acquires update data indicating instructions of changes in the guest program upon completion of the duplication process. The update data storage stores the update data acquired by the update data acquirer. In such a configuration, the maintenance reflector may reflect in the guest program the update data stored in the update data storage, wherein the replacement process has been performed on the guest program. Alternatively, the maintenance reflector may perform the replacement process after reflecting in the guest copy the update data stored in the update data storage, wherein the maintenance process has been performed on the guest copy.

DESCRIPTION OF THE PREFERRED EMBODIMENTS

Embodiments of the present invention will now be discussed with reference to the drawings.

First Embodiment

Figure 1:
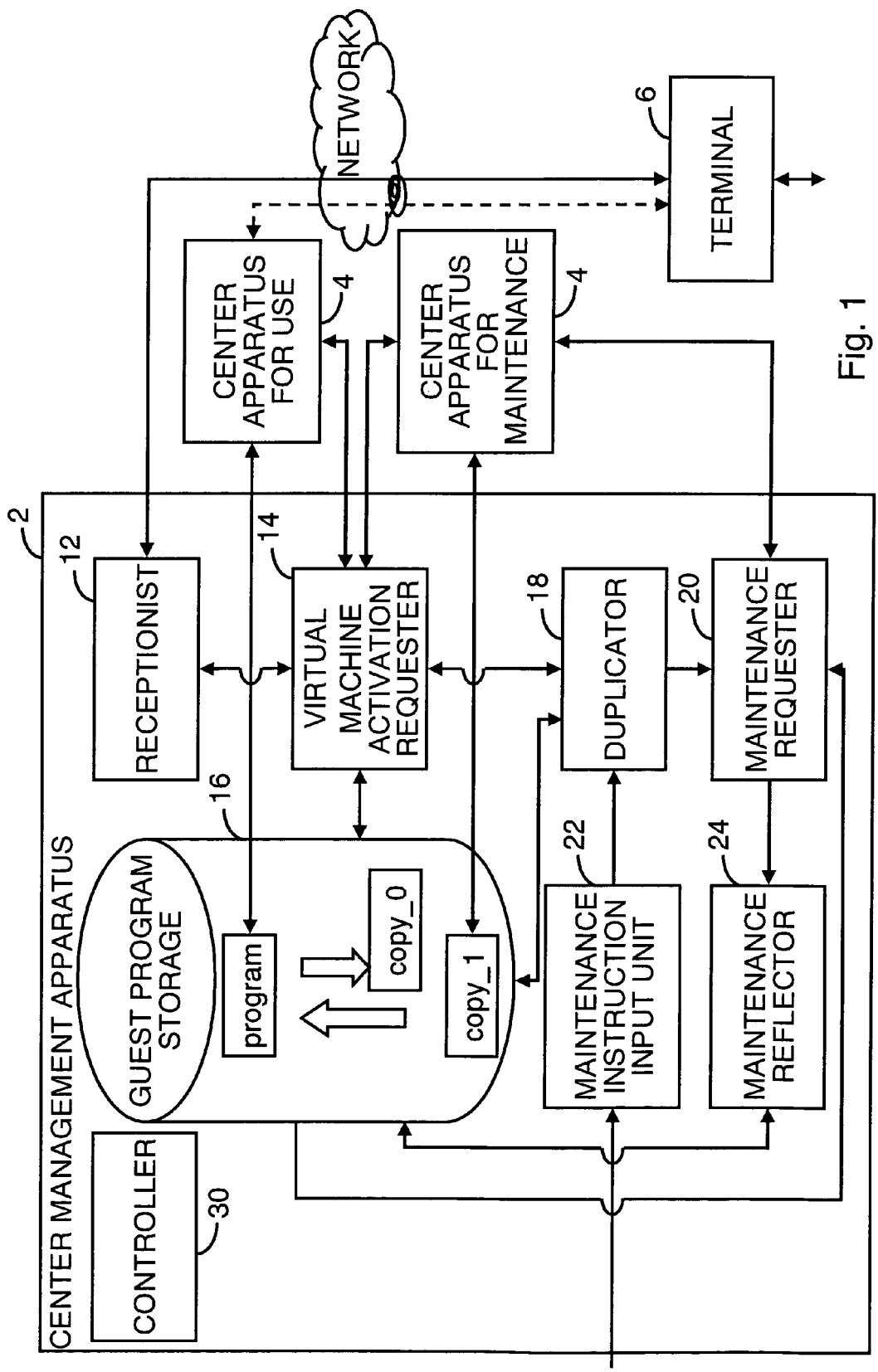
FIG. 1 is a diagram illustrating a system configuration of a center management apparatus according to a first embodiment of the present invention.

FIG. 1 is a diagram illustrating a system configuration of a center management apparatus according to a first embodiment of the present invention. A center management apparatus 2 according to the first embodiment includes a receptionist 12, a virtual machine activation requester 14, a guest program storage 16, a duplicator 18, a maintenance requester 20, a maintenance instruction input unit 22, a maintenance reflector 24, and a controller 30. The receptionist 12 accepts a request for usage from a terminal 6. The virtual machine activation requester 14 selects a center apparatus 4 and requests the selected center apparatus 4 to activate a virtual machine. The guest program storage 16 stores a guest program. The duplicator 18 duplicates the guest program. The maintenance requester 20 requests an activated virtual machine to perform a maintenance process. The maintenance instruction input unit 22 accepts an instruction for maintenance. The maintenance reflector 24 reflects a result of the maintenance process in the guest program. The controller 30 performs overall control of the center management apparatus 2. It is noted that among functions of the center management apparatus 2, functions that are not explicitly discussed in the specification are all performed by the controller 30.

Figure 2:
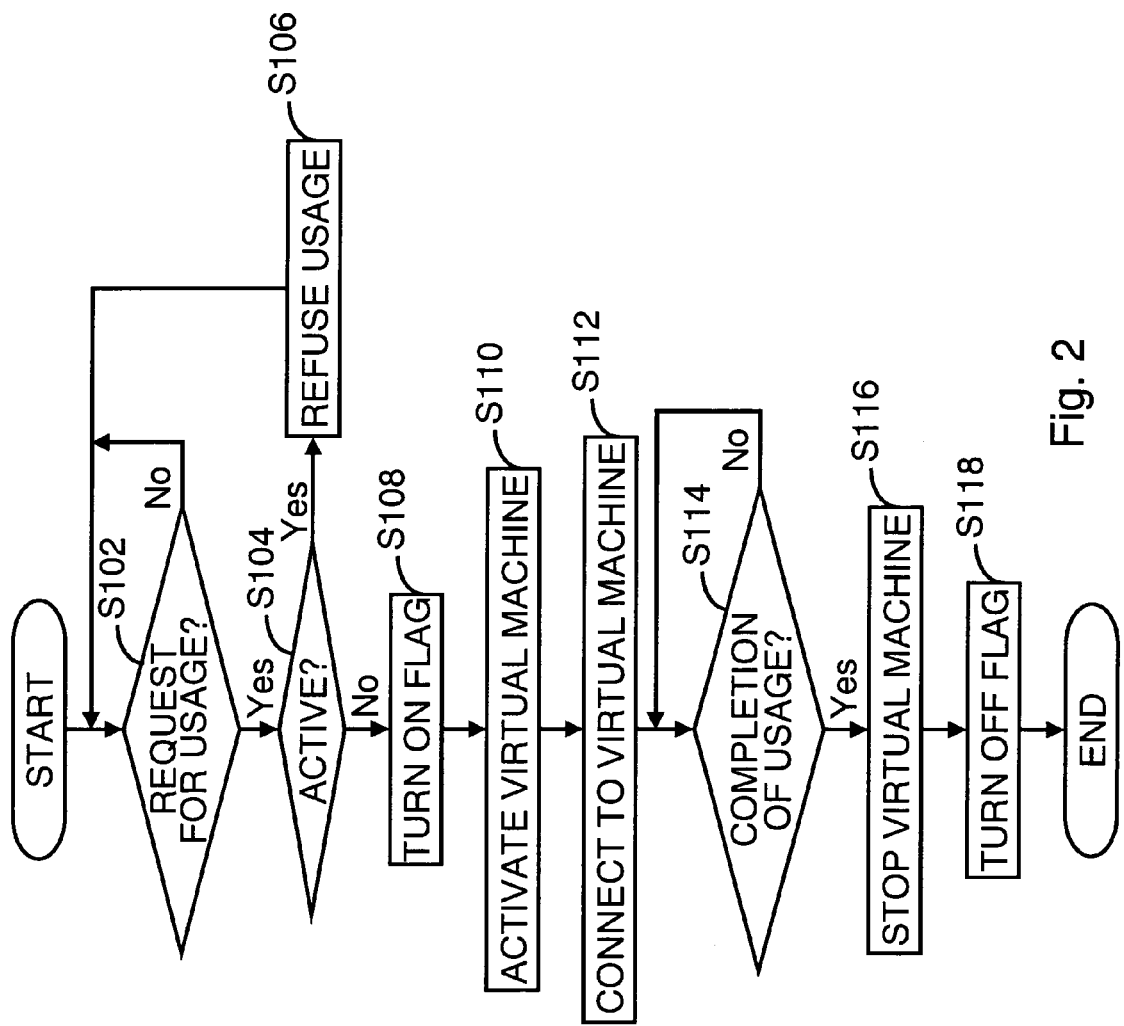
FIG. 2 is a diagram illustrating a flowchart of a virtual machine activation process for user's usage in a center management apparatus according to a first embodiment of the present invention.

A process in the center management apparatus 2 in a case where a user uses a center apparatus 4 will first be discussed. FIG. 2 is a diagram illustrating a flowchart of a virtual machine activation process for user's usage in a center management apparatus according to a first embodiment of the present invention. The flow of the virtual machine activation process for user's usage in the first embodiment will now be discussed with reference to FIG. 2.

In operation S102, the receptionist 12 waits for a request for usage from the terminal 6.

In operation S104, when the receptionist 12 has accepted a request for usage (operation S102: Yes), the virtual machine activation requester 14 determines whether a specified guest program is active. The method for the determination will be discussed next.

Figure 3:
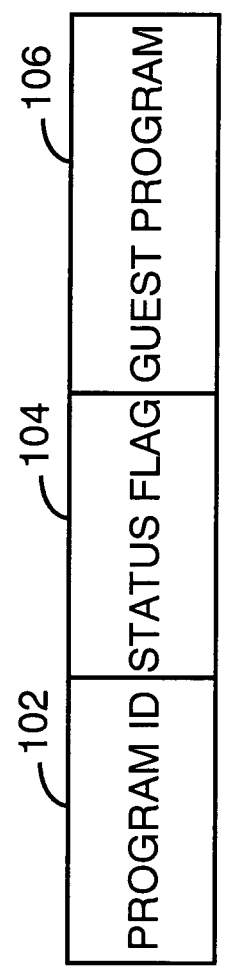
FIG. 3 is a diagram illustrating a data structure of data stored in a guest program storage of a center management apparatus according to a first embodiment of the present invention.

FIG. 3 is a diagram illustrating a data structure of data stored in a guest program storage of a center management apparatus according to a first embodiment of the present invention. A program ID (identifier) 102 is identification data for identifying a guest program. A status flag 104 indicates whether a guest program is active. When the guest program is active, the status flag 104 is on. When the guest program is inactive, the status flag 104 is off. The guest program 106 is a main body of the guest program.

When a status flag 104 associated with a specified program ID 102 is on, the virtual machine activation requester 14 determines that a guest program 106 associated with the specified program ID 102 is active.

The method for determining whether a guest program is active is not limited to this method, and any method may be used. For example, a usage monitor that determines whether a guest program is active may be provided, and the virtual machine activation requester 14 may determine, on the basis of the result of determination by the usage monitor, whether a guest program is active.

In operation S106, when the specified guest program is active (operation S104: Yes), the receptionist 12 refuses the terminal 6 to use the guest program.

In operation S108, when the specified guest program is inactive (operation S104: No), the virtual machine activation requester 14 turns on the status flag 104, among the data stored in the guest program storage 16, associated with the specified program ID 102.

In operation S110, the virtual machine activation requester 14 selects a center apparatus for use 4 and requests the selected center apparatus for use 4 to activate a virtual machine based on the specified guest program.

In operation S112, the receptionist 12 sends data indicative of the activated virtual machine to the terminal 6 so that the terminal 6 can connect to the virtual machine activated in the selected center apparatus for use 4. Alternatively, the terminal 6 may connect, via the receptionist 12, to the virtual machine activated in the selected center apparatus for use 4.

In operation S114, the virtual machine activation requester 14 waits for completion of the user's usage.

In operation S116, when the user's usage has been completed (operation S114: Yes), the virtual machine activation requester 14 stops the virtual machine.

In operation S118, the virtual machine activation requester 14 turns off the status flag 104, among the data stored in the guest program storage 16, associated with the specified program ID 102.

A process in the center management apparatus 2 in a case where a maintenance process is performed will be discussed next.

Figure 4:
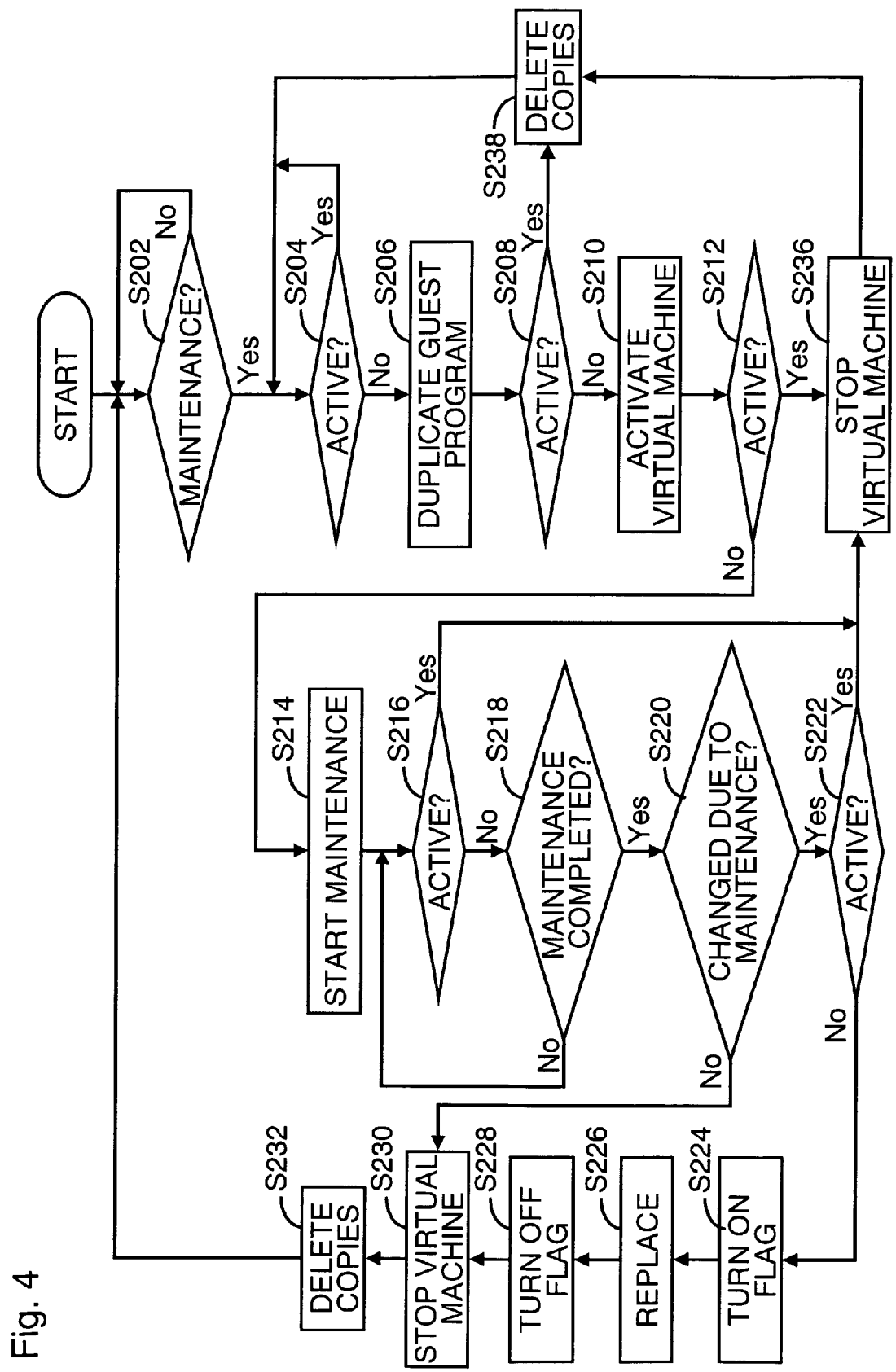
FIG. 4 is a diagram illustrating a flowchart of a virtual machine activation process for maintenance in the center management apparatus according to a first embodiment of the present invention.

FIG. 4 is a diagram illustrating a flowchart of a virtual machine activation process for maintenance in the center management apparatus according to a first embodiment of the present invention. The flow of the virtual machine activation process for maintenance in the first embodiment will now be discussed with reference to FIG. 4.

In operation S202, the maintenance instruction input unit 22 waits for an instruction for maintenance from a center administrating person. In the first embodiment, an instruction for maintenance is issued by, but not exclusively, a center administrating person. For example, a maintenance management unit that is provided inside or outside the center management apparatus 2 may issue an instruction for maintenance periodically or when an event of a certain type has occurred. An instruction for maintenance may include any content. However, an instruction for maintenance needs to include at least data capable of identifying a guest program to receive maintenance and data capable of identifying a maintenance program that describes a maintenance process. The maintenance program may be included in the guest program to receive maintenance or may be managed independent of the guest program.

In operation S204, when the maintenance instruction input unit 22 has accepted an instruction for maintenance (operation S202: Yes), the duplicator 18 determines whether a specified guest program is active. The method for the determination is similar to that in operation S104 shown in FIG. 2. When the specified guest program is active (operation S204: Yes), the duplicator 18 waits until the specified guest program is inactive.

In operation S206, when the specified guest program is inactive (operation S204: No), the duplicator 18 duplicates the specified guest program to create a guest copy. In FIG. 1, the guest program and the guest copy are represented as "program" and "copy_1", respectively. The duplicator 18 further creates another copy "copy_0" for checking change.

In operation S208, the virtual machine activation requester 14 determines whether the specified guest program is active. When the specified guest program is active (operation S208: Yes), the process proceeds to operation S238.

In operation S210, when the specified guest program is inactive (operation S208: No), the virtual machine activation requester 14 selects a center apparatus for maintenance 4 and requests the selected center apparatus for maintenance 4 to activate a virtual machine based on the guest copy.

In operation S212, the maintenance requester 20 determines whether the specified guest program is active. When the specified guest program is active (operation S212: Yes), the process proceeds to operation S236.

In operation S214, when the specified guest program is inactive (operation S212: No), the maintenance requester 20 requests the activated virtual machine to start a maintenance process.

In operation S216, the maintenance requester 20 determines whether the specified guest program is active. When the specified guest program is active (operation S216: Yes), the process proceeds to operation S236.

In operation S218, when the specified guest program is inactive (operation S216: No), the maintenance requester 20 determines whether the maintenance process has been completed. When the maintenance process has not been completed (operation S218: No), the process returns to operation S216.

In operation S220, when the maintenance process has been completed (operation S218: Yes), the maintenance reflector 24 determines whether the guest copy has been changed due to the maintenance process. The determination is made by comparing the "copy_1" after the maintenance process with the "copy_0". In the first embodiment, the "copy_0" which is a copy for checking change is created in advance and then is compared with the "copy_1" after the maintenance process. However, the method for checking change is not limited to this method. Alternatively, for example, when a write operation has been performed on the guest copy during the maintenance process, the center management apparatus 2 may receive a notification from the center apparatus for maintenance 4, or the center management apparatus 2 may monitor a write operation on the guest copy so that a change in the guest copy can be recognized and stored. Alternatively yet, in a case where the guest copy has a time stamp indicating the date and time of the last update of the content, it may be determined on ground of a change in the value of the time stamp that the guest copy has been changed. Moreover, a change in a specific file may be disregarded. For example, when a file to which only temporary data is written during the maintenance process exists, a change in the file may be disregarded. In this arrangement, when no change occurs in other files, replacement of the guest copy is unnecessary. When the guest copy has not been changed (operation S220: No), the process proceeds to operation S230.

In operation S222, when the guest copy has been changed (operation S220: Yes), the maintenance reflector 24 determines whether the specified guest program is active. When the specified guest program is active (operation S222: Yes), the process proceeds to operation S236.

In operation S224, when the specified guest program is inactive (operation S222: No), the maintenance reflector 24 turns on the status flag 104, among the data stored in the guest program storage 16, associated with the specified program ID 102.

In operation S226, the maintenance reflector 24 replaces with the guest copy the guest program, among the data stored in the guest program storage 16, associated with the specified program ID 102.

In operation S228, the maintenance reflector 24 turns off the status flag 104, among the data stored in the guest program storage 16, associated with the specified program ID 102.

In operation S230, the virtual machine activation requester 14 requests the selected center apparatus for maintenance 4 to stop the virtual machine.

In operation S232, the duplicator 18 deletes the guest copy and the copy for checking change. Then, the process returns to operation S202.

In operation S236, when the specified guest program is active (operation S222: Yes), the virtual machine activation requester 14 requests the selected center apparatus for maintenance 4 to stop the virtual machine.

In operation S238, the duplicator 18 deletes the guest copy and the copy for checking change. Then, the process returns to operation S204.

As discussed above, in the first embodiment, the maintenance process is performed on a guest copy that is a copy of a guest program. Thus, even in the middle of the maintenance process, the maintenance process can be stopped when the user requests for usage. Moreover, a request for usage from the user is refused only when the changes in the guest copy due to the maintenance process are reflected in the guest program. Thus, the guest program can receive maintenance so that the user's usage is not disturbed so much.

Second Embodiment

Figure 5:
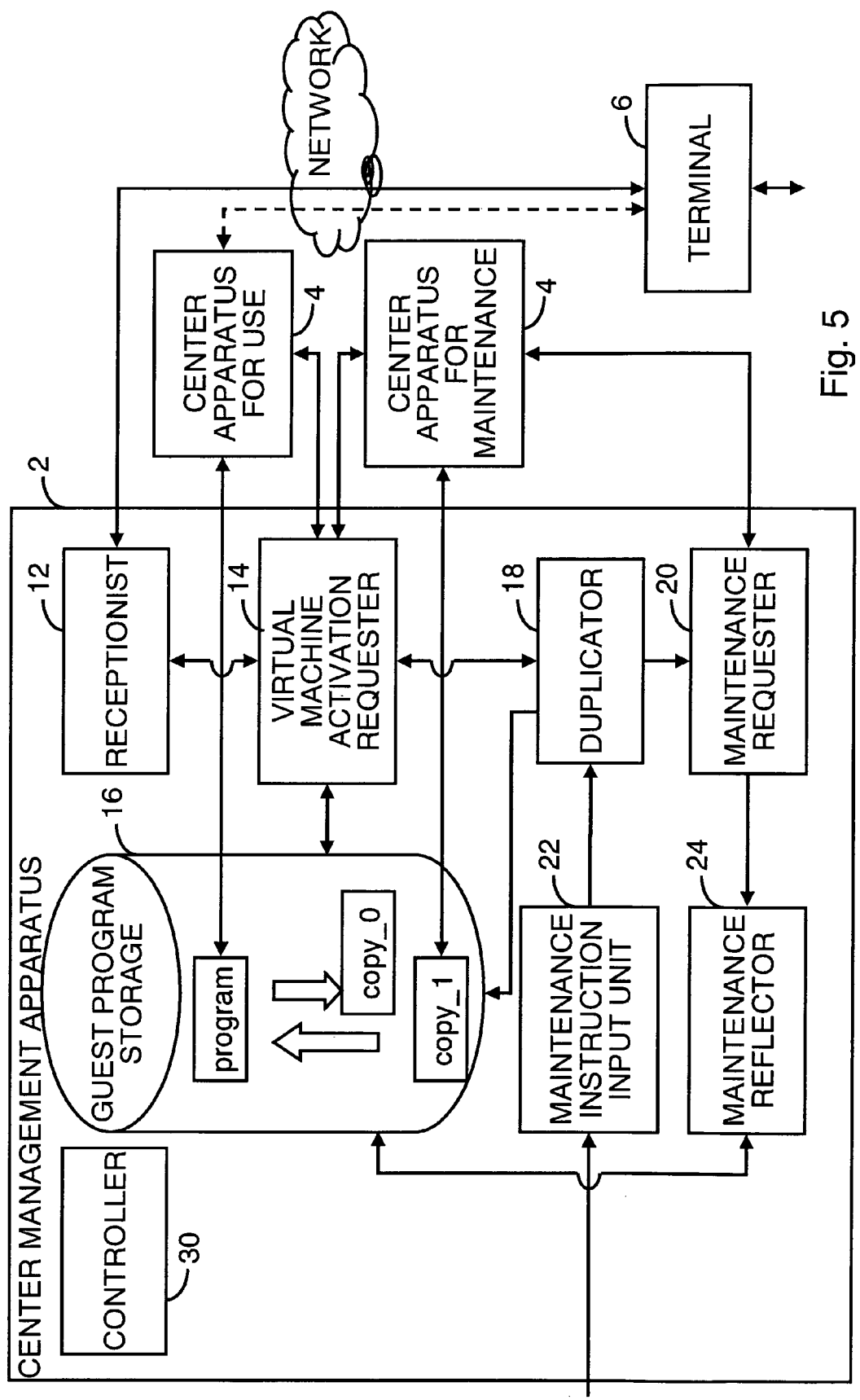
FIG. 5 is a diagram illustrating a system configuration of a center management apparatus according to a second embodiment of the present invention.

FIG. 5 is a diagram illustrating a system configuration of a center management apparatus according to a second embodiment of the present invention. The components of the center management apparatus 2 according to the second embodiment are similar to the components of the center management apparatus 2 according to the first embodiment shown in FIG. 1. However, process in each component is different in some points. The duplicator 18 and the maintenance requester 20 do not determine whether the guest program is active. The maintenance reflector 24 determines whether the guest program has been changed after the guest copy was created.

Figure 6:
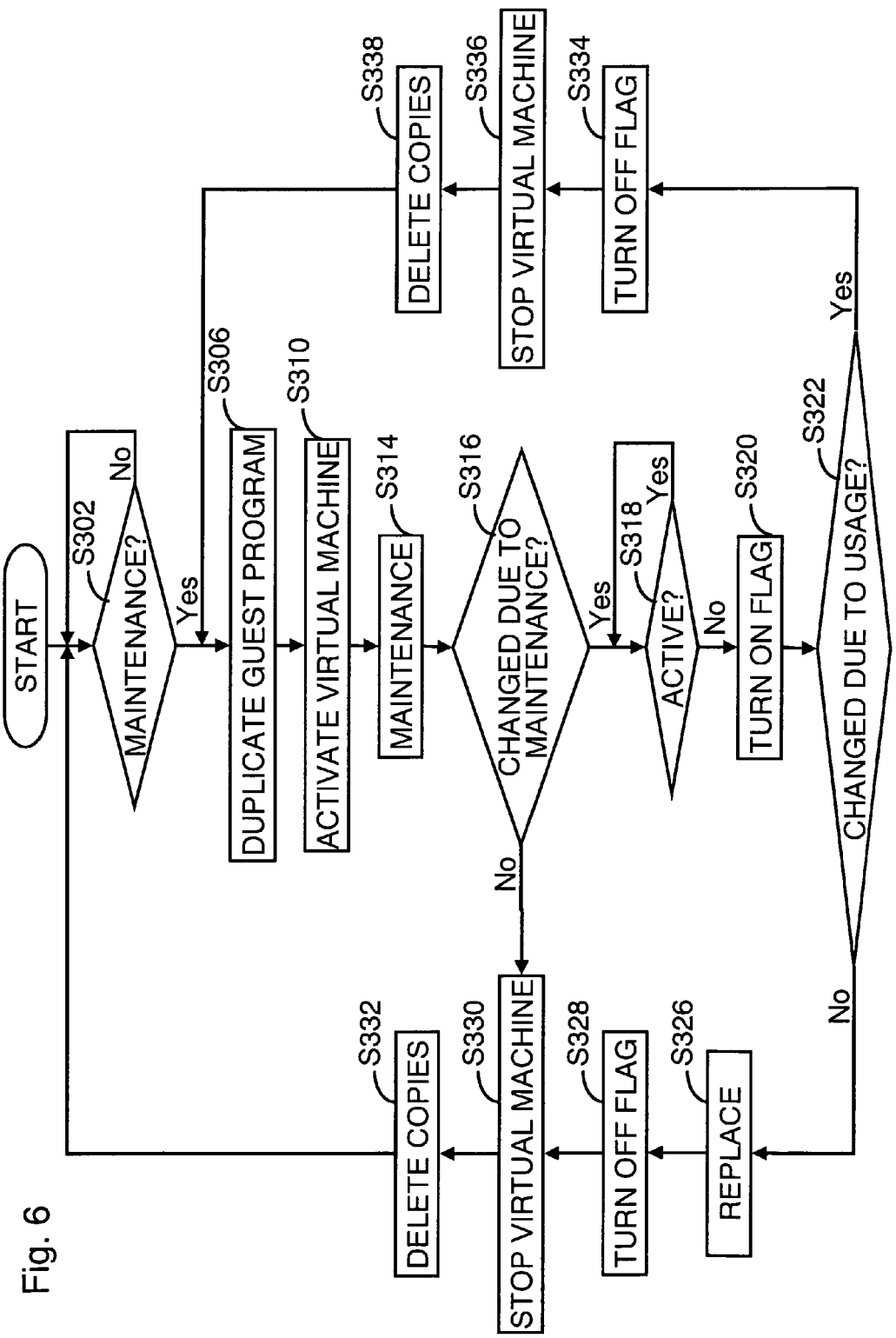
FIG. 6 is a diagram illustrating a flowchart of a virtual machine activation process for maintenance in the center management apparatus according to a second embodiment of the present invention.

FIG. 6 is a diagram illustrating a flowchart of a virtual machine activation process for maintenance in the center management apparatus according to a second embodiment of the present invention. The flow of the virtual machine activation process for maintenance in the second embodiment will now be discussed with reference to FIG. 6.

In operation S302, the maintenance instruction input unit 22 waits for an instruction for maintenance from a center administrating person. In the second embodiment, an instruction for maintenance is issued by, but not exclusively, a center administrating person. For example, a maintenance management unit that is provided inside or outside the center management apparatus 2 may issue an instruction for maintenance periodically or when an event of a certain type has occurred.

In operation S306, when the maintenance instruction input unit 22 has accepted an instruction for maintenance (operation S302: Yes), the duplicator 18 duplicates a specified guest program to create a guest copy. In FIG. 5, the guest program and the guest copy are represented as "program" and "copy_1", respectively. The duplicator 18 further creates another copy "copy_0" for checking change.

In operation S310, the virtual machine activation requester 14 selects a center apparatus for maintenance 4 and requests the selected center apparatus for maintenance 4 to activate a virtual machine based on the guest copy.

In operation S314, the maintenance requester 20 requests the activated virtual machine to perform a maintenance process.

In operation S316, upon completion of the maintenance process, the maintenance reflector 24 determines whether the guest copy has been changed due to the maintenance process. The method for the determination is similar to that in operation S220 shown in FIG. 4. When the guest copy has not been changed (operation S316: No), the process proceeds to operation S330.

In operation S318, when the guest copy has been changed (operation S316: Yes), the maintenance reflector 24 determines whether the specified guest program is active. The method for the determination is similar to that in operation S104 shown in FIG. 2. When the specified guest program is active (operation S318: Yes), the duplicator 18 waits until the specified guest program is inactive.

In operation S320, when the specified guest program is inactive (operation S318: No), the maintenance reflector 24 turns on the status flag 104, among the data stored in the guest program storage 16, associated with the specified program ID 102.

In operation S322, the maintenance reflector 24 determines whether the specified guest program has been changed. The determination is made by comparing the "program" after the maintenance process with the "copy_0". In the second embodiment, the "copy_0" which is a copy for checking change is created in advance and then is compared with the "program". However, the method for checking change is not limited to this method. Alternatively, for example, when a write operation has been performed on the guest program during user's usage, the center management apparatus 2 may monitor the write operation on the guest program so that a change in the guest program can be recognized and stored.

In operation S326, when the specified guest program has not been changed (operation S322: No), the maintenance reflector 24 replaces with the guest copy the guest program, among the data stored in the guest program storage 16, associated with the specified program ID 102.

In operation S328, the maintenance reflector 24 turns off the status flag 104, among the data stored in the guest program storage 16, associated with the specified program ID 102.

In operation S330, the virtual machine activation requester 14 requests the selected center apparatus for maintenance 4 to stop the virtual machine.

In operation S332, the duplicator 18 deletes the guest copy and the copy for checking change. Then, the process returns to operation S302.

In operation S334, when the specified guest program has been changed (operation S322: Yes), the maintenance reflector 24 turns off the status flag 104, among the data stored in the guest program storage 16, associated with the specified program ID 102.

In operation S336, the virtual machine activation requester 14 requests the selected center apparatus for maintenance 4 to stop the virtual machine.

In operation S338, the duplicator 18 deletes the guest copy and the copy for checking change. Then, the process returns to operation S306.

As discussed above, in the second embodiment, when the guest program has not been changed after the guest copy was created, the guest program is replaced with the guest copy; and when the guest program has been changed after the guest copy was created, the maintenance process is performed again. Thus, the guest copy can receive maintenance regardless of the status of the user's usage.

Third Embodiment

Figure 7:
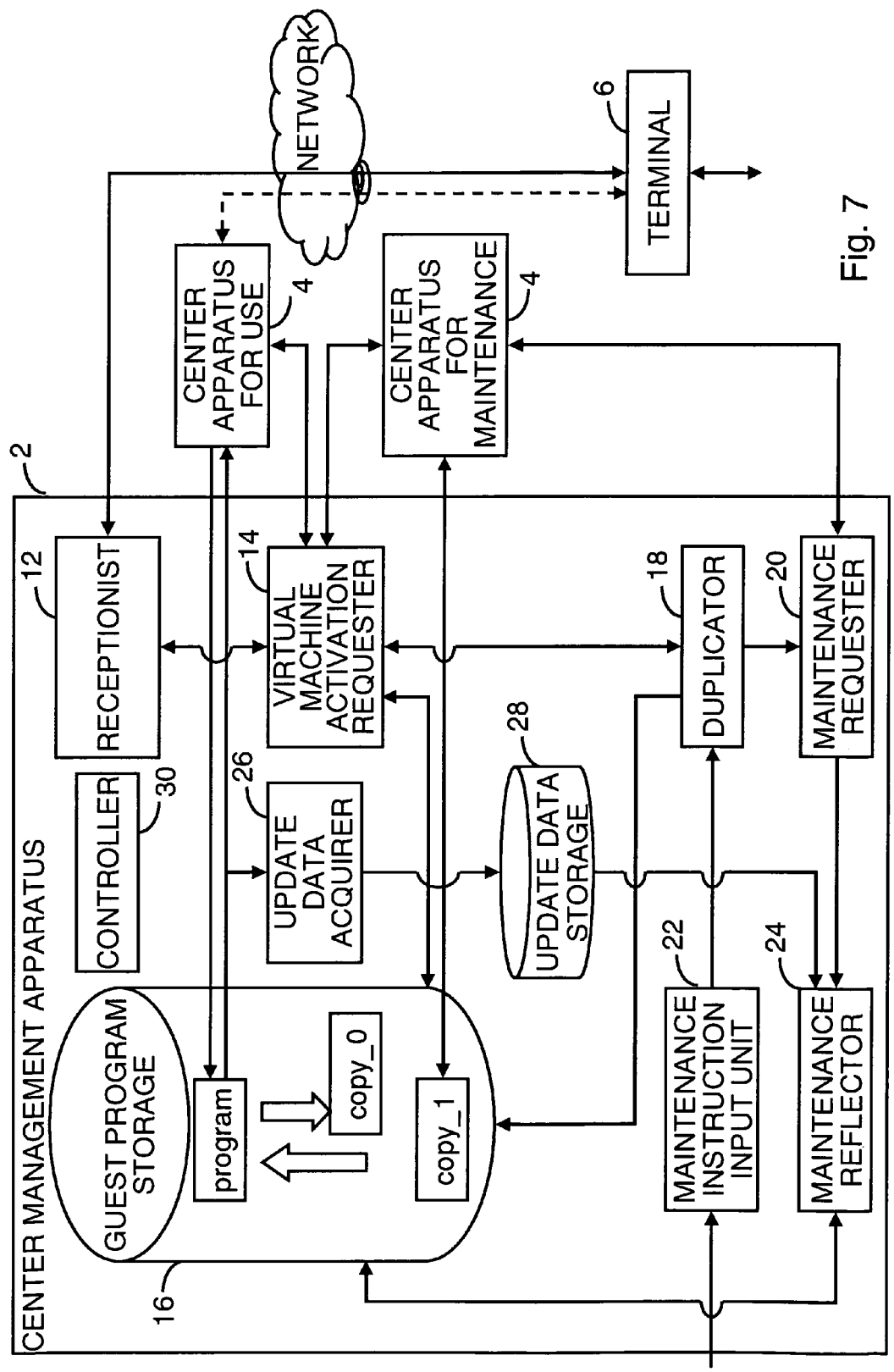
FIG. 7 is a diagram illustrating a system configuration of a center management apparatus according to a third embodiment of the present invention.

FIG. 7 is a diagram illustrating a system configuration of a center management apparatus according to a third embodiment of the present invention. The center management apparatus 2 according to the third embodiment includes, in addition to the components of the center management apparatus 2 according to the second embodiment shown in FIG. 5, an update data acquirer 26 that monitors a write operation on the guest program storage 16 by a center apparatus for use 4 to acquire update data and an update data storage 28 that stores the acquired update data. When a guest program has been changed due to user's usage, the maintenance reflector 24 makes similar changes in a guest copy and then replaces the guest program with the guest copy.

Figure 8:
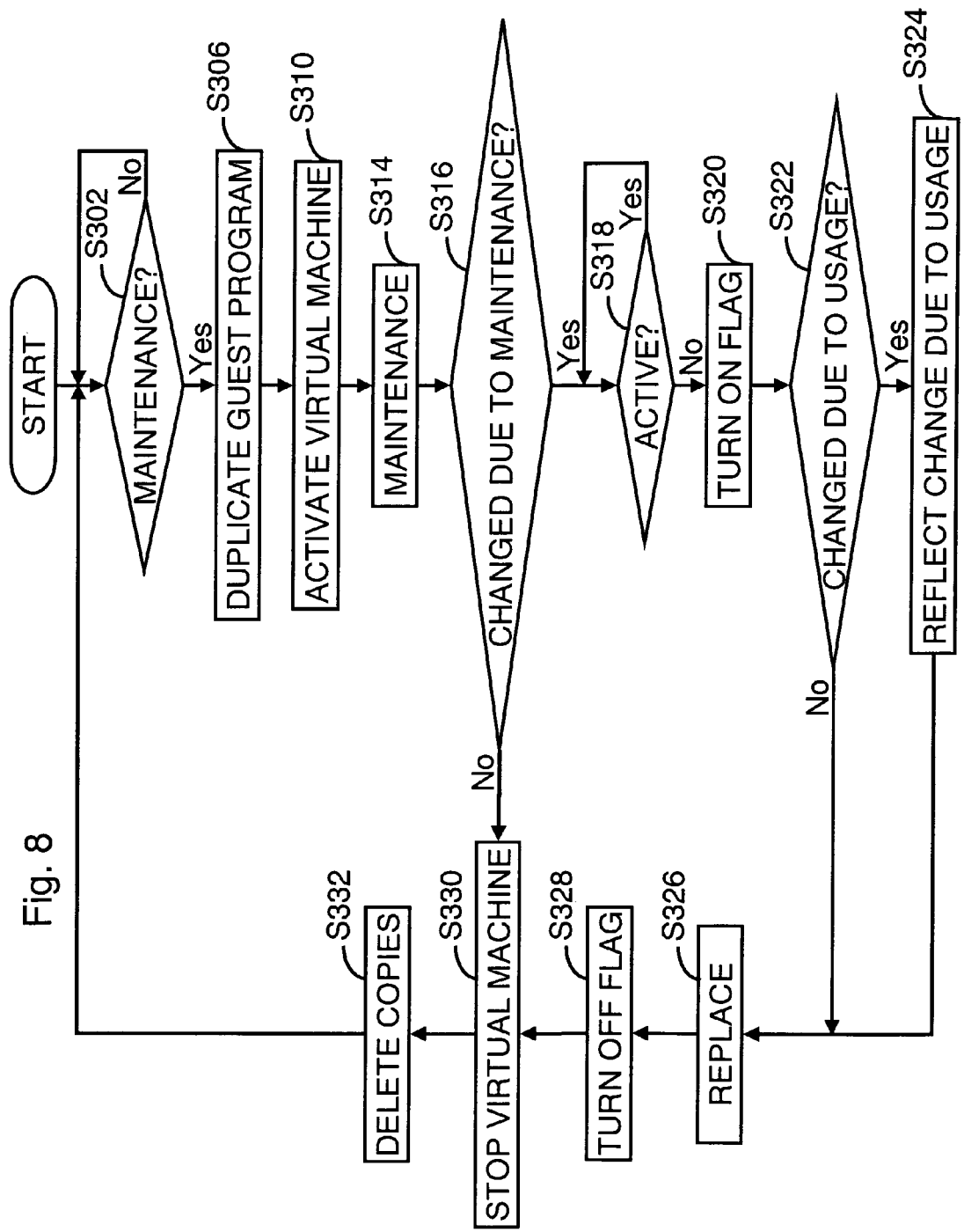
FIG. 8 is a diagram illustrating a flowchart of a virtual machine activation process for maintenance in the center management apparatus according to the third embodiment of the present invention.

FIG. 8 is a diagram illustrating a flowchart of a virtual machine activation process for maintenance in the center management apparatus according to the third embodiment of the present invention. The flowchart shown in FIG. 8 is different from the flowchart shown in FIG. 6 in that operations S334, S336, and S338 are deleted, and operation S324 is added. Moreover, processes in operations S306 and S332 are changed in some points. A part of the flow of the virtual machine activation process for maintenance in the third embodiment that is different from the flowchart shown in FIG. 6 will now be discussed.

In operation S306, when the maintenance instruction input unit 22 has accepted an instruction for maintenance (operation S302: Yes), the duplicator 18 duplicates a specified guest program to create a guest copy. In FIG. 7, the guest program and the guest copy are represented as "program" and "copy_1", respectively. The duplicator 18 further creates "copy_0" which is another copy for checking change. Moreover, the update data acquirer 26 starts to monitor a write operation on the specified guest program and stores data indicative of the write operation as update data in the update data storage 28.

In operation S324, when the specified guest program has been changed (operation S322: Yes), the maintenance reflector 24 updates the guest copy on the basis of the update data stored in the update data storage 28.

In operation S332, the duplicator 18 deletes the guest copy and the copy for checking change. Moreover, the update data acquirer 26 stops monitoring of a write operation on the specified guest program and deletes the update data stored in the update data storage 28. Then, the process returns to operation S302.

In the third embodiment, the guest program is replaced with the guest copy after the update data of the guest program has been reflected in the guest copy. Alternatively, the update data of the guest program may be reflected in the guest program after the guest program has been replaced with the guest copy.

As discussed above, in the third embodiment, even when the guest program has been changed due to user's usage, the update data is reflected in the guest copy after the maintenance process has been performed. Thus, the maintenance process need not be performed again.

According to the embodiments of the present invention, a maintenance process is performed on a copy of a guest program so as to avoid conflict with the user's usage. Thus, a center management method that can perform a maintenance process on a guest program so that the user's usage is not disturbed so much can be provided.

The center management apparatuses according to the embodiments of the present invention can be implemented as not only hardware but also software for computers. For example, a program that causes a computer to perform the functions of the receptionist 12, the virtual machine activation requester 14, the duplicator 18, the maintenance requester 20, the maintenance instruction input unit 22, the maintenance reflector 24, and the controller 30 shown in FIG. 1 may be created and executed by causing the computer to read the program into a memory to implement the center management apparatus 2.

Figure 9:
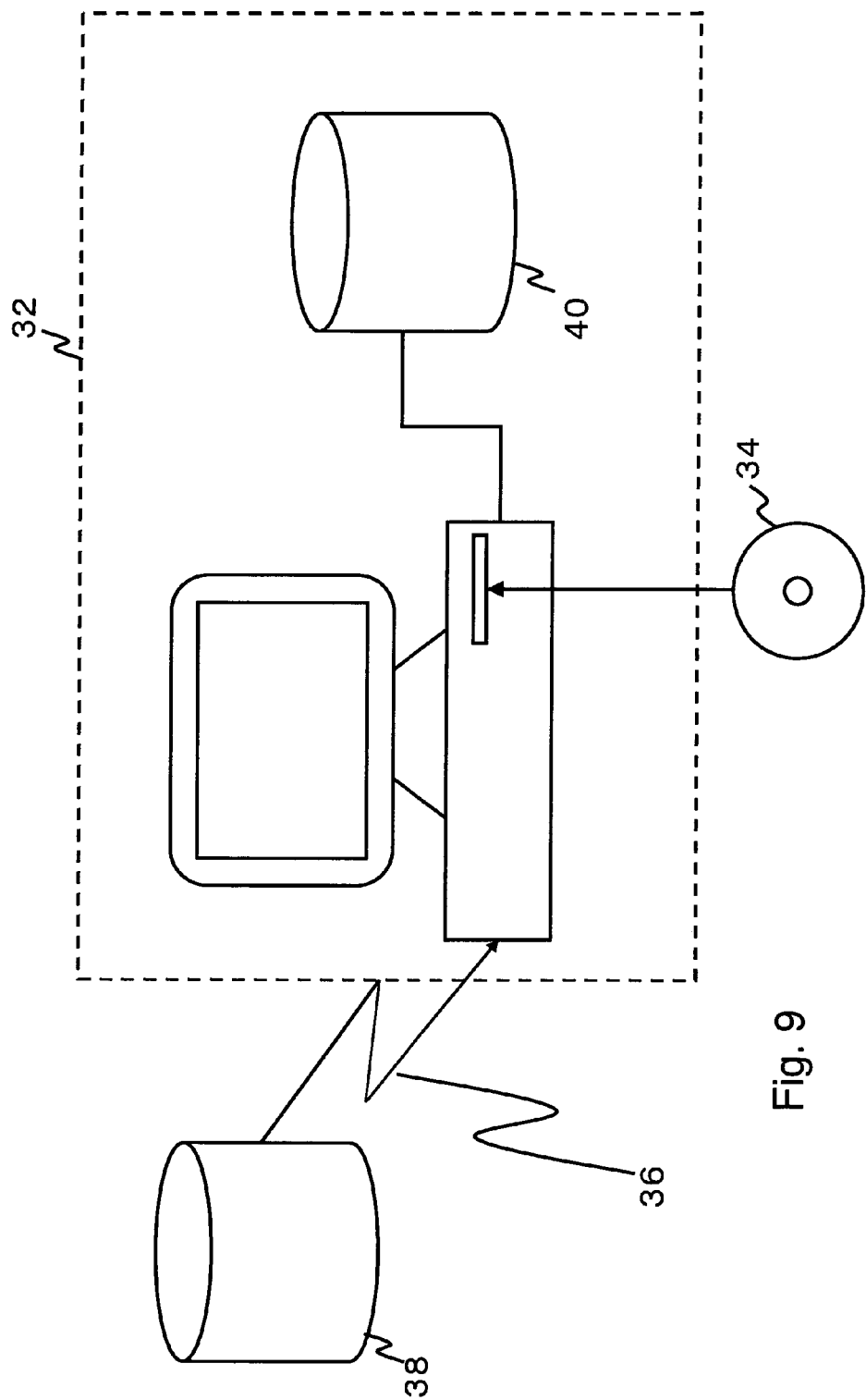
FIG. 9 is a diagram illustrating an example of a computer environment.

The program, which implements a center management apparatus according to the embodiments of the present invention, may be stored in not only a portable recording medium 34 such as a compact disk-read only memory (CD-ROM), a CD-rewritable (CD-RW), a digital versatile disk-recordable (DVD-R), a DVD-random access memory (DVD-RAM), a DVD-RW, or a flexible disk, but also a storage unit 38 that is connected via a communication line 36 and a storage unit/recording medium 40 such as a hard disk or a RAM in a computer system 32, as shown in FIG. 9. When the program is executed, the program is loaded into a main memory to be executed.

The components of each of the center management apparatuses according to the embodiments of the present invention may be implemented in any combination. A plurality of ones of the components may be implemented as a single part, or one of the components may include a plurality of parts.

What is claimed is:

1. A center management apparatus to manage a center apparatus that performs in a virtual machine environment a process described in a guest program, the center management apparatus comprising:

a computer, to execute the process including:

storing guest programs in association with data capable of identifying each of the guest programs and storing an execution flag in association with the guest program, the execution flag including indication as to whether the process described in the guest program is active;

accepting designation of first data capable of identifying a maintenance program describing a maintenance process, and second data capable of identifying the guest program to receive maintenance;

duplicating, only when the computer determines that the guest program is inactive, the guest program to generate a guest copy, the guest program being identified with the second data;

requesting the center apparatus to activate a virtual machine, by transmitting a first control signal indicating an instruction to perform a process described in the guest copy;

requesting the center apparatus to perform the maintenance process, by transmitting a second control signal indicating an instruction to perform the maintenance process, the center apparatus performing the process described in the guest copy, the maintenance process being described in a maintenance program identified with the first data;

replacing, only when the computer determines that the guest program is inactive, the guest program with the guest copy when the guest copy is changed as a result of the maintenance process, the guest program being identified with the second data; and stopping, during a transmission phase, the transmitting of the second control signal when the execution flag indicates that the process is active, wherein the center management apparatus identifies that the guest copy has been updated by the maintenance process before performing the replacing.

2. The center management apparatus of claim 1, the process comprising:

stopping the duplicating when the execution flag indicates that the process described in the guest program is active, stopping the replacing when the execution flag indicates that the process described in the guest program is active before starting the replacing, and when the execution flag indicates that the process described in the guest program is inactive before starting the replacing, the computer executing the process performs:

setting the execution flag to indicate that the process described in the guest program is active, performing the replacing, and setting the execution flag to indicate that the process described in the guest program is inactive upon completion of the replacing.

3. The center management apparatus of claim 1, wherein the replacing is performed only when the guest program has not been changed from the guest program of a time when the duplicating was performed.

4. The center management apparatus of claim 1, the process comprising:

acquiring update data indicating instructions of changes in the guest program upon completion of the duplicating;

storing the acquired update data;
reflecting in the guest program the stored update data the replacing being performed on the guest program, or
performing the replacing after the reflecting in the guest copy the stored update data, the maintenance process being performed on the guest copy.

5. The center management apparatus of claim 1, the process comprising:
determining whether the replacing of the guest program is successful.

6. The center management apparatus of claim 5, wherein the determining comprises comparing a copy of the guest program after the replacing to a copy of the guest program before the replacing.

7. The center management apparatus of claim 1, wherein the determining whether the guest program is active is based on usage of the guest program.

8. The center management apparatus of claim 1, wherein the second control signal is transmitted only when the computer determines that the guest program is inactive.

9. A non-transitory computer readable medium storing a center management program to manage a center apparatus, that performs in a virtual machine environment, a process described in a guest program, the center management program causing a computer to execute a center management method comprising:
storing guest programs in association with data capable of identifying each of the guest programs and storing an execution flag in association with the guest program, the execution flag including indication as to whether the process described in the guest program is active;
accepting designation of first data capable of identifying a maintenance program describing a maintenance process, and second data capable of identifying the guest program to receive maintenance;
duplicating, only when the computer determines that the guest program is inactive, the guest program to generate a guest copy, the guest program being identified with the second data;
requesting the center apparatus, to activate a virtual machine, by transmitting a first control signal indicating an instruction to perform a process described in the guest copy;
requesting the center apparatus to perform the maintenance process, by transmitting a second control signal indicating an instruction to perform the maintenance process, the center apparatus performing the process described in the guest copy, the maintenance process being described in a maintenance program identified with the first data;
replacing, only when the computer determines that the guest program is inactive, the guest program with the guest copy when the guest copy is changed as a result of the maintenance process, the guest program being identified with the second data; and
stopping, during a transmission phase, the transmitting of the second control signal when the execution flag indicates that the process is active,
wherein the center management apparatus identifies that the guest copy has been updated by the maintenance process before performing the replacing.

10. The non-transitory computer-readable medium of claim 9, wherein the determining whether the guest program is active based on the execution flag.

11. The non-transitory computer-readable medium of claim 9, wherein the determining whether the guest program is active is based on usage of the guest program.

12. The non-transitory computer readable medium of claim 9, wherein the second control signal is transmitted only when the computer determines that the guest program is inactive.

13. A center management method executed by a center management apparatus to manage a center apparatus that performs in a virtual machine environment, a process described in a guest program, the center management method comprising:
storing guest programs in association with data capable of identifying each of the guest programs and storing an execution flag in association with the guest program, the execution flag including indication as to whether the process described in the guest program is active;
accepting designation of first data capable of identifying a maintenance program describing a maintenance process, and second data capable of identifying the guest program to receive maintenance;
duplicating, only when a computer determines that the guest program is inactive, the guest program to generate a guest copy, the guest program being identified with the second data;
requesting the center management apparatus to activate a virtual machine, by transmitting a first control signal indicating an instruction to perform a process described in the guest copy;
requesting the center management apparatus to perform the maintenance process, the center management apparatus performing the process described in the guest copy, by transmitting a second control signal indicating an instruction to perform the maintenance process, the maintenance process being described in a maintenance program identified with the first data;
replacing, only when a computer determines that the guest program is inactive, the guest program with the guest copy when the guest copy is changed as a result of the maintenance process, the guest program being identified with the second data; and
stopping, during a transmission phase, the transmitting of the second control signal when the execution flag indicates that the process is active,
wherein the center management apparatus identifies that the guest copy has been updated by the maintenance process before performing the replacing.

14. The center management method of claim 13, wherein the determining whether the guest program is active is based on the execution flag.

15. The center management method of claim 13, wherein the determining whether the guest program is active is based on usage of the guest program.

16. The center management method of claim 13, wherein the second control signal is transmitted only when the computer determines that the guest program is inactive.

* * * * *